(12) United States Patent
Sato

(10) Patent No.: US 10,422,620 B2
(45) Date of Patent: Sep. 24, 2019

(54) CONTACT-TYPE POSITION MEASURING DEVICE AND MEASURING METHOD USING THE SAME

(71) Applicant: DMG MORI CO., LTD., Nara (JP)

(72) Inventor: Koji Sato, Nara (JP)

(73) Assignee: DMG MORI CO., LTD., Yamatokoriyama-Shi, Nara (JP)

( * ) Notice: Subject to any disclaimer, the term of this patent is extended or adjusted under 35 U.S.C. 154(b) by 153 days.

(21) Appl. No.: 15/535,799

(22) PCT Filed: Dec. 1, 2015

(86) PCT No.: PCT/JP2015/083714
§ 371 (c)(1),
(2) Date: Jun. 14, 2017

(87) PCT Pub. No.: WO2016/098576
PCT Pub. Date: Jun. 23, 2016

(65) Prior Publication Data
US 2017/0363404 A1   Dec. 21, 2017

(30) Foreign Application Priority Data

Dec. 15, 2014  (JP) ................................ 2014-252937

(51) Int. Cl.
*G01B 5/12*   (2006.01)
*B23Q 17/20*  (2006.01)

(52) U.S. Cl.
CPC .............. *G01B 5/12* (2013.01); *B23Q 17/20* (2013.01)

(58) Field of Classification Search
CPC .................................... G01B 5/08; G01B 5/12

USPC ............................................... 33/555.1, 555.3
See application file for complete search history.

(56) References Cited

U.S. PATENT DOCUMENTS

| | | | |
|---|---|---|---|
| 4,753,555 A * | 6/1988 | Thompson | B23B 47/28 33/542 |
| 4,905,378 A | 3/1990 | Culver et al. | |
| 5,259,119 A | 11/1993 | Yoshioka et al. | |
| 8,464,434 B1 | 6/2013 | Kostenick et al. | |

(Continued)

FOREIGN PATENT DOCUMENTS

| | | |
|---|---|---|
| DE | 102012025252 A1 | 6/2014 |
| EP | 2009388 A1 | 12/2008 |

(Continued)

OTHER PUBLICATIONS

European Search Report of European Patent Application No. 15869784.7 dated May 14, 2018.

(Continued)

*Primary Examiner* — George B Bennett
(74) *Attorney, Agent, or Firm* — IP Business Solutions, LLC

(57) ABSTRACT

A contact-type position measuring device is configured by a straight hole diameter measuring probe measuring a diameter of straight hole by moving in a radius direction and contacting to an internal peripheral surface of a straight hole, which extends to an axis direction; and a chamfered hole diameter measuring probe measuring a diameter of chamfered hole by moving in the axis direction and contacting to an internal peripheral surface of a chamfered hole.

1 Claim, 3 Drawing Sheets

(56) References Cited

U.S. PATENT DOCUMENTS

| | | | |
|---|---|---|---|
| 8,908,901 B2* | 12/2014 | Mamour | G01B 5/0032 |
| | | | 382/100 |
| 2015/0040414 A1 | 2/2015 | Nakamura et al. | |
| 2015/0369581 A1* | 12/2015 | Toso | G01B 3/26 |
| | | | 702/94 |
| 2018/0023945 A1* | 1/2018 | Mariller | G01B 5/004 |
| | | | 33/832 |
| 2018/0149457 A1* | 5/2018 | Masuta | G01B 5/08 |

FOREIGN PATENT DOCUMENTS

| | | |
|---|---|---|
| EP | 2808642 A1 | 12/2014 |
| JP | 60-69501 A | 4/1985 |
| JP | S60-51407 U | 4/1985 |
| JP | H03-23303 U | 3/1991 |
| JP | 9-2423347 A | 9/1997 |
| WO | 2013/108875 A1 | 7/2013 |

OTHER PUBLICATIONS

International Search Report issued for corresponding PCT/JP2015/083714 application.

* cited by examiner

CONTACT-TYPE POSITION MEASURING DEVICE AND MEASURING METHOD USING THE SAME

CROSS-REFERENCE TO RELATED APPLICATIONS

This is the U.S. National Phase under 35 U.S.C. 371 of International Application No. PCT/JP2015/83714, filed on Dec. 1, 2015, which in turn claims the benefit of Japanese Patent Application No. 2014-252937, filed on Dec. 15, 2014, the disclosures of which are incorporated by reference herein.

BACKGROUND OF THE INVENTION

Field of the Invention

The present invention relates to a contact-type position measuring device, which is used when, for example, a chamfering process is performed by a machine tool, and a measuring method using the same.

Description of the Related Art

In a case that a straight hole is formed in a workpiece by a machine tool, there is a case in which a chamfering process is performed to an opening rim part of the straight hole. As a measuring device in order to measure a diameter of a chamfered hole formed by such chamfering process, for example, Japanese Utility Model Patent Application No. H03-23303 discloses a device that measures the diameter of the chamfered hole by contacting an approximately conical-shaped measuring probe to the chamfered part.

In the case that the chamfering process was performed to the opening rim part of the straight hole, in addition to the measurement of the diameter of the chamfered hole, there was a case in which it was also required to measure the diameter of the straight hole. In such case, first, the diameter of the straight hole was measured by the straight hole diameter measuring probe, and after replacing the straight hole diameter measuring probe with the chamfered hole diameter measuring probe such as the conventional measuring device, the diameter of the chamfered hole was measured. Therefore, the problems were that the measuring work was required much more effort, and the working time took longer.

Further, when the diameter of the chamfered hole was measured by the conventional measuring device, it was required that the axis of the measuring probe was accurately aligned with the hole center of the chamfered hole. However, such alignment work took much time and effort, and in some cases, there was a chance in which the measuring accuracy of the diameter of the chamfered hole was decreased.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The present invention was created considering the aforementioned conventional status, and an object is to provide a contact-type position measuring device, which measures a diameter of a straight hole and a diameter of a chamfered hole in a short period of time by a simple work and improves the measuring accuracy of the diameter of the chamfered hole, and a measuring method using the same.

In some embodiments of the present disclosure, a contact-type position measuring device includes a straight hole diameter measuring probe measuring a diameter of a straight hole by moving in a radius direction and contacting to an internal peripheral surface of the straight hole which extends in an axis direction; and a chamfered hole diameter measuring probe measuring a diameter of a chamfered hole by moving in the axis direction and contacting to an internal peripheral surface of the chamfered hole.

In some embodiments of the present disclosure, in the contact-type position measuring device as recited above, the straight hole diameter measuring probe is detachable from the chamfered hole diameter measuring probe.

In some embodiments of the present disclosure, a measuring method of a diameter of a chamfered hole using the contact-type position measuring device includes the steps of measuring a diameter of a straight hole by a straight hole diameter measuring probe of the contact-type position measuring device as recited above, and computing a center of the straight hole by the measured diameter of the straight hole; moving a chamfered hole diameter measuring probe to be aligned with the computed center of the straight hole; and measuring the diameter of the chamfered hole by moving the chamfered hole diameter measuring probe in a straight hole direction.

According to some embodiments as recited above, the contact-type position measuring device is provided with the straight hole diameter measuring probe, which measures a diameter of a straight hole, and the chamfered hole diameter measuring probe, which measures a diameter of a chamfered hole, so that the diameter of the straight hole is measured by moving the straight hole diameter measuring probe in the radius direction, and next, the diameter of the chamfered hole can be measured by moving the chamfered hole diameter measuring probe in the axis direction. Therefore, it is not required to replace the straight hole diameter measuring probe with the chamfered hole diameter measuring probe, so that the diameter of the straight hole and the diameter of the chamfered hole can be measured in a short period of time by a simple work. According to some embodiments as recited above, the straight hole diameter measuring probe is detachable from the chamfered hole diameter measuring probe, so that the straight hole diameter measuring probe can be removed when only the diameter of the chamfered hole is measured. Therefore, both of the measuring device, which combines both measuring probes, and the measuring device, which includes only the chamfered hole diameter measuring probe, can be provided.

According to some embodiments as recited above, the center of the straight hole is computed from the diameter of the straight hole measured by the straight hole diameter measuring probe, and the diameter of the chamfered hole is measured by moving the chamfered hole diameter measuring probe in the straight hole direction to be aligned with the computed center of the straight hole, so that the diameter of the chamfered hole can be measured in the state in which the chamfered hole diameter measuring probe is accurately aligned with the center of the straight hole. Therefore, the measuring accuracy of the diameter of the chamfered hole can be improved.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

DETAILED DESCRIPTION

In the following paragraphs, some embodiments of the invention will be described by way of example and not limitation. It should be understood based on this disclosure that various other modifications can be made by those in the art based on these illustrated embodiments.

Hereinafter, embodiments of the present invention will be described in reference to the drawings.

Embodiment 1

Figure 1:
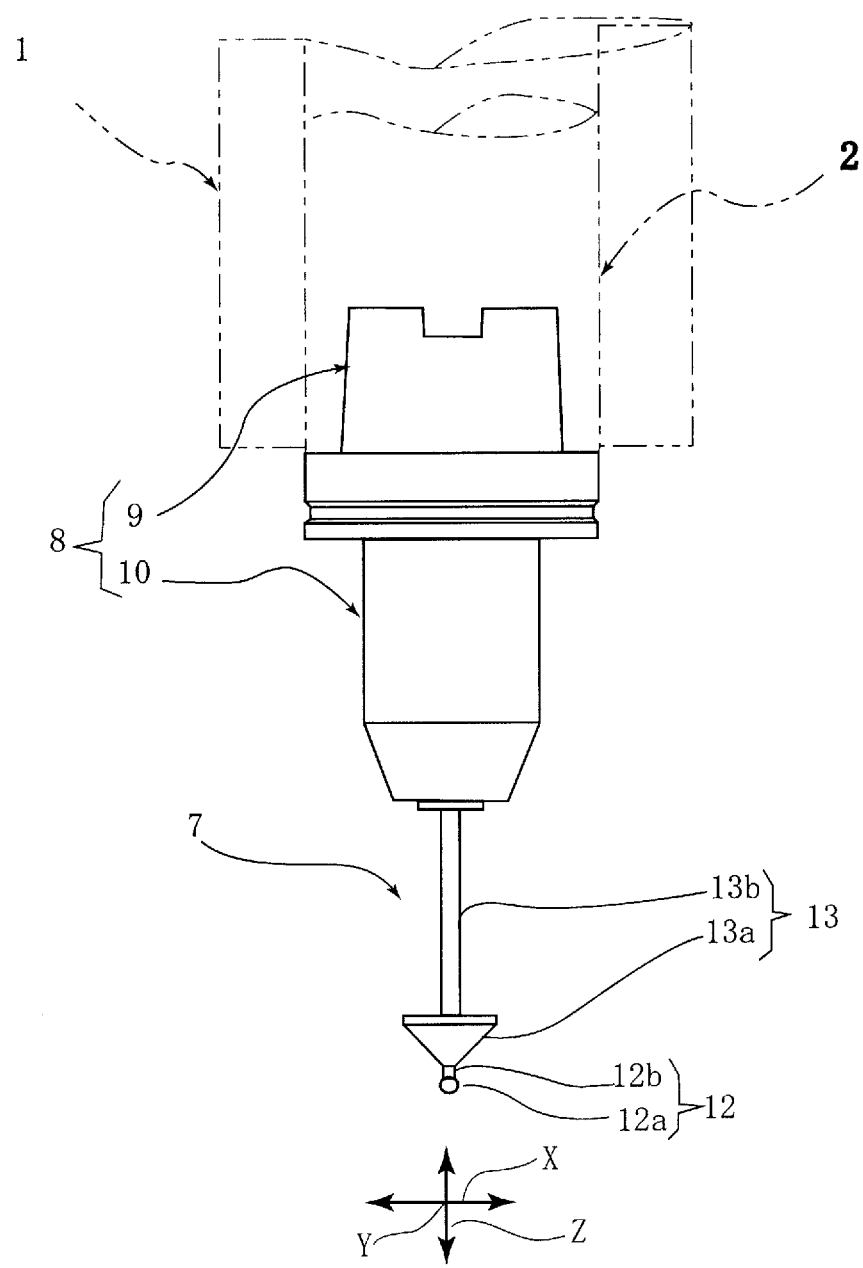
FIG. 1 is a diagram showing a configuration of a contact-type position measuring device according to embodiment 1 of the present invention.
Figure 2:
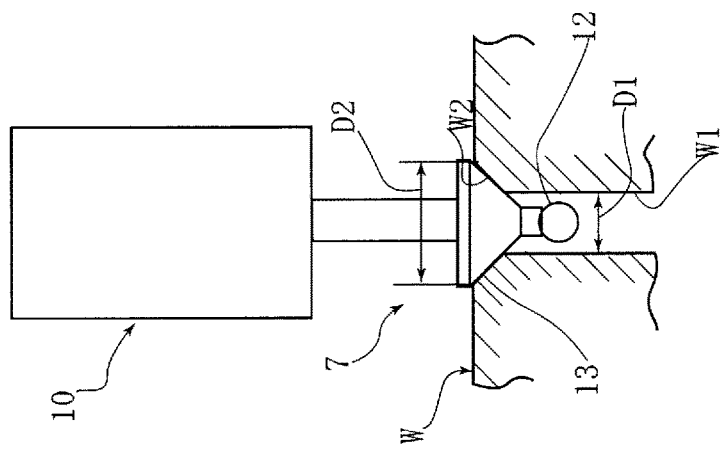
FIG. 2(a) is a diagram showing a measuring method by the contact-type position measuring device.
FIG. 2(b) is a diagram showing the measuring method by the contact-type position measuring device.
FIG. 2(c) is a diagram showing the measuring method by the contact-type position measuring device.
Figure 2:
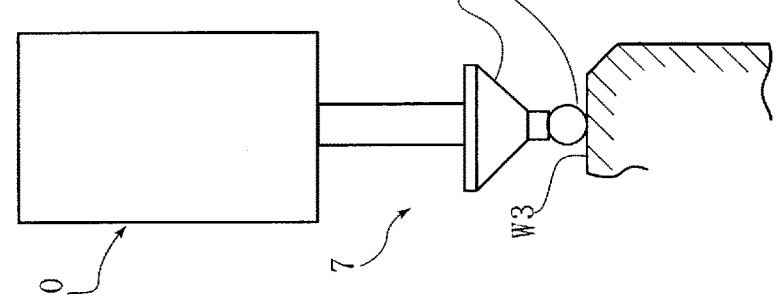
Figure 2:
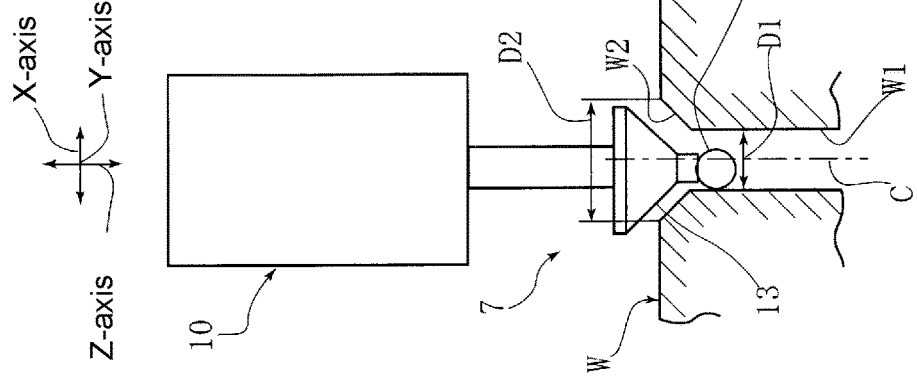
Figure 3:
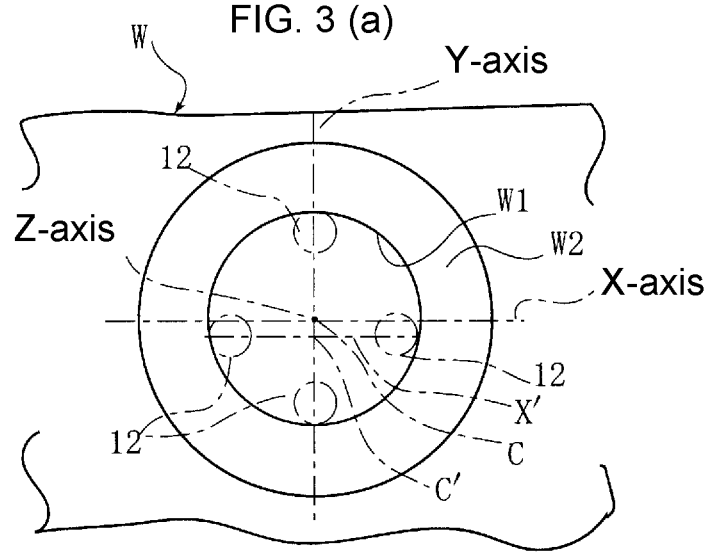
FIG. 3(a) is a diagram showing the measuring method.
FIG. 3(b) is a diagram showing the measuring method.
Figure 3:
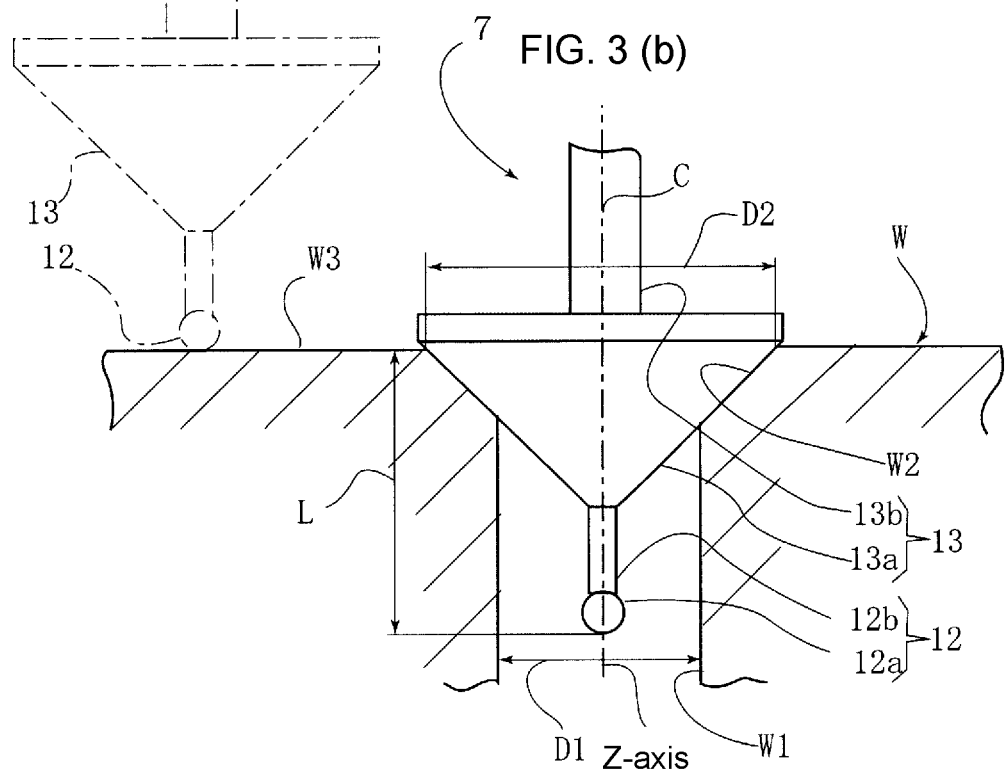

FIGS. 1 to 3 are the illustrations to describe the contact-type position measuring device according to embodiment 1 of the present invention and the measuring method using the same.

In these drawings, reference numeral 1 denotes a spindle head arranged in a machine tool such as a machining center, etc. This spindle head 1 is movably supported by a column (not shown) in a perpendicular direction (Z-axis direction), and in the spindle head 1, a spindle 2 is rotatably supported via a bearing (not shown). A work table (not shown) in which a workpiece W is mounted is configured to be movable in a paper-surface-right-and-left-horizontal direction (X-axis direction) and a paper-surface-front-and-back-horizontal direction (Y-axis direction)(see FIG. 1).

The machining center mounts a predetermined tool (not shown) in the spindle 2, and a predetermined straight hole W1 and a chamfered hole W2, which has a predetermined tapered angle in an opening rim part of the straight hole W1, are formed by performing a drill machining, an internal diameter machining, etc. to the workpiece W by relatively moving the spindle head 1 and the work table in the X-axis, Y-axis, and Z-axis directions, respectively. In the present embodiment, the tapered angle of the chamfered hole W2 is set in 45 degrees.

In the spindle 2, a holder 8, which is provided with a contact-type position measuring device 7, is detachably mounted. The holder 8 includes a tapered-shaped clamp part 9, which is detachably mounted to the spindle 2, and a holding member 10 in which the position measuring device 7 is mounted.

The position measuring device 7 is provided with a straight hole diameter measuring probe 12, which measures a diameter of straight hole D1 by moving inside the straight hole W1 in a radial direction and contacting to the internal peripheral surface of the straight hole W1, and a chamfered hole diameter measuring probe 13, which measures a diameter of chamfered hole D2 by moving in an axis direction of the straight hole W1 and contacting to the internal peripheral surface of the chamfered hole W2. Concretely, as described later, a contact signal is outputted when the straight hole diameter measuring probe 12 and the chamfered hole diameter measuring probe 13 contact to the internal peripheral surface, and the diameter of straight hole D1 and the diameter of chamfered hole D2 are computed based on the movement amounts in the X-axis direction, Y-axis direction, and Z-axis direction at the time of the contact signal output.

The chamfered hole diameter measuring probe 13 includes a downwardly conical-shaped measuring part 13a, which forms the tapered surface in 45 degrees, and a mounting rod 13b, which connects to the center of the bottom surface of the measuring part 13a, and the mounting rod 13b is mounted and fixed to the holding member 10.

The straight hole diameter measuring probe 12 includes a spherical-shaped measuring part 12a and a support rod 12b which connects to the center of the upper surface of the measuring part 12a. The support rod 12b is connected to the tip part of the measuring part 13a of the chamfered hole diameter measuring probe 13. The shaft length of the support rod 12b is appropriately set based on the depth of the chamfered hole W2. Further, the straight hole diameter measuring probe 12 and the chamfered hole diameter measuring probe 13 are set in the manner in which the axis is aligned.

Alternatively, the support rod 12b of the straight hole diameter measuring probe 12 may be detachably connected to the tip part of the measuring part 13a of the chamfered hole diameter measuring probe 13. In this case of the detachable structure, for example, a screw type or a fitting type may be employed.

In order to measure the diameter of chamfered hole D2 by the contact-type position measuring device 7, the X-axis movement amount X' is measured by inserting the straight hole diameter measuring probe 12 into the straight hole W1, moving in the radius direction (X-axis direction), and contacting to the internal peripheral surface of the straight hole W1, and the center C' of the movement amount X' is computed. Next, the diameter of straight hole D1 is measured by moving the straight hole diameter measuring probe 12 in the Y-axis direction in a manner of going through the center C', and the center C of the straight hole W1 is computed from the measured diameter of straight hole D1 (see FIGS. 2(a) and 3(a)).

Next, the straight hole diameter measuring probe 12 is raised, and the lower surface of the measuring part 12a of the straight hole diameter measuring probe 12 is contacted to the upper surface (reference surface) W3 of the workpiece W. Next, the chamfered hole diameter measuring probe 13 is moved to a position where the center C is aligned, and the measuring part 13a of the chamfered hole diameter measuring probe 13 is moved in the Z-axis direction (straight hole direction) and is contacted to the internal peripheral surface of the chamfered hole W2 so as to measure an axis direction stroke amount L from the reference surface W3 to the contact of the chamfered hole W2. The diameter of chamfered hole D2 is computed based on the measurement value (see FIGS. 2(c) and 3(b)).

According to such present embodiment, the straight hole diameter measuring probe 12, which measures the diameter of straight hole D1 by contacting to the internal peripheral surface of the straight hole W1 formed in the workpiece W, and the chamfered hole diameter measuring probe 13, which measures the diameter of chamfered hole D2 by contacting to the chamfered hole W2 formed in the opening rim part of the straight hole W1, are provided. The straight hole center C is computed from the diameter of straight hole D1 measured by the straight hole diameter measuring probe 12, and the diameter of chamfered hole D2 is measured in the state in which the chamfered hole diameter measuring probe 13 is aligned with the straight hole center C. Therefore, the measuring work, which measures from the straight hole W1 to the straight hole center C, and the measuring work, which measures the diameter of chamfered hole D2 in the state in which the straight hole center C is aligned, can be continuously performed. Accordingly, it is not required to replace the straight hole diameter measuring probe with the chamfered hole diameter measuring probe, so that the measuring work is simplified and it can be measured in a short period of time by the simple work. Further, the chamfered hole diameter measuring probe 13 can be accurately aligned with the axis of the straight hole W1, so that the measuring accuracy of the diameter of chamfered hole can be improved.

Further, in the present invention, the straight hole diameter measuring probe 12 can be detachably mounted to the chamfered hole diameter measuring probe 13. In such case, it may be replaced if the diameter of chamfered hole D2 is only measured, so that both of the measuring device, which combines both measuring probes, and the measuring device, which includes only the chamfered hole diameter measuring probe, can be provided.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A measuring method of a chamfered hole diameter using a contact-type position measuring device, the method comprising the steps of:

measuring a diameter of a straight hole by moving a straight hole diameter measuring probe in a radius direction along an X-axis direction, by contacting to an internal peripheral surface of the straight hole which extends in an axis direction perpendicular to the X-axis direction, by computing a center of the straight hole by the measured diameter of the straight hole, and by moving the straight hole diameter measuring probe in the radius direction along a Y-axis direction perpendicular to the axis direction and the X-axis direction in a manner of going through the center of the movement amount in the X-axis direction;

moving a chamfered hole diameter measuring probe to be aligned with the computed center of the straight hole;

measuring the chamfered hole diameter by moving the chamfered hole diameter measuring probe in the axis direction and by contacting to an internal peripheral surface of the chamfered hole so as to measure a stroke amount; and computing the diameter of the chamfered hole based on the measured stroke amount.

* * * * *